US007223807B2

(12) United States Patent
Okamoto et al.

(10) Patent No.: US 7,223,807 B2
(45) Date of Patent: May 29, 2007

(54) HIGH DIELECTRIC RESIN COMPOSITION

(75) Inventors: Satoshi Okamoto, Tsukuba (JP); Shiro Katagiri, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 541 days.

(21) Appl. No.: 10/763,385

(22) Filed: Jan. 26, 2004

(65) Prior Publication Data

US 2004/0164282 A1 Aug. 26, 2004

(30) Foreign Application Priority Data

Jan. 30, 2003 (JP) ............................ 2003-021597

(51) Int. Cl.
*C08K 3/22* (2006.01)
*B29D 7/01* (2006.01)

(52) U.S. Cl. ..................... 524/404; 524/430; 524/431; 524/604; 264/212

(58) Field of Classification Search ................ 524/404, 524/430, 431, 604
See application file for complete search history.

(56) References Cited

U.S. PATENT DOCUMENTS 3,442,699 A * 5/1969 Dalton ....................... 347/164
4,473,682 A * 9/1984 Calundann et al. ......... 524/605
5,739,193 A * 4/1998 Walpita et al. .............. 524/413
5,922,453 A * 7/1999 Horn, et al. ................ 428/325
5,962,122 A * 10/1999 Walpita et al. .............. 428/325
6,838,546 B2 * 1/2005 Okamoto et al. ........... 528/495
7,063,892 B2 * 6/2006 Okamoto et al. ........ 428/423.4

OTHER PUBLICATIONS

Electronic Materials 2002, Sep., pp. 25-29.

* cited by examiner

*Primary Examiner*—Tae H Yoon
(74) *Attorney, Agent, or Firm*—Foley And Lardner LLP

(57) ABSTRACT

An object of the present invention is to provide a resin composition which is capable of manufacturing a high dielectric resin film having high dielectric constant and small dielectric loss tangent. And the present invention provides high dielectric resin composition comprising:

a high dielectric filler; and resin;

wherein a relative dielectric constant of the high dielectric filler satisfies the following formulae (1) and (2).

$$[(\epsilon_T-\epsilon_{25})/\epsilon_{25}]_{MAX}\leqq 0.03 \quad (1)$$

$$40\leqq\epsilon_{25}\leqq 1000 \quad (2)$$

17 Claims, 1 Drawing Sheet

HIGH DIELECTRIC RESIN COMPOSITION

HIGH DIELECTRIC RESIN COMPOSITION

FIELD OF THE INVENTION

The present invention relates to a high dielectric resin composition.

BACKGROUND OF THE INVENTION

In recent years, in the field of information communication devices, a resin composition which a high dielectric resin film having high dielectric constant and small dielectric loss tangent can be produced from is desired, since the frequency utilized for a condenser built in a base material, or an antenna becomes a high frequency (100 MHz or more).

Conventionally, a high dielectric resin film having a high dielectric constant (a relative dielectric constant of 5 or more) has been successfully manufactured by using a resin composition in which a high dielectric filler such as barium titanate and strontium titanate is compounded into resin; however, higher dielectric constant brings larger dielectric loss tangent (Electronic Materials 2002, September, page 29 edited by Kogyo Chosakai Publishing Co., Ltd.).

SUMMARY OF THE INVENTION

The object of the present invention is to provide a resin composition which is capable of providing a high dielectric resin film having high dielectric constant and small dielectric loss tangent.

Through earnest studies for finding out a resin composition as described above, the inventors of the present invention have completed the present invention by finding out that a resin composition containing a high dielectric filler such that a relative dielectric constant thereof satisfies the following formulae (1) and (2), and resin is capable of providing a high dielectric resin film having high dielectric constant and small dielectric loss tangent.

The present invention is to provide a high dielectric resin composition comprising a high dielectric filler and resin, in which a relative dielectric constant of the filler satisfies the following formulae (1) and (2).

$$[(\in_T-\in_{25})/\in_{25}]_{MAX} \leqq 0.03 \quad (1)$$

$$40 \leqq \in_{25} \leqq 1000 \quad (2)$$

In the formulae, $\in_T$ represents a relative dielectric constant of a high dielectric filler at a temperature of T, the temperature T is from −20 to 80° C., $\in_{25}$ represents a relative dielectric constant of a high dielectric filler at a temperature of 25° C., and $[(\in_T-\in_{25})/\in_{25}]_{MAX}$ represents a maximum value of an absolute value of a relative dielectric constant variation of $(\in_T-\in_{25})/\in_{25}$.)

DETAILED DESCRIPTION OF PREFERRED EMBODIMENTS

Figure 1:
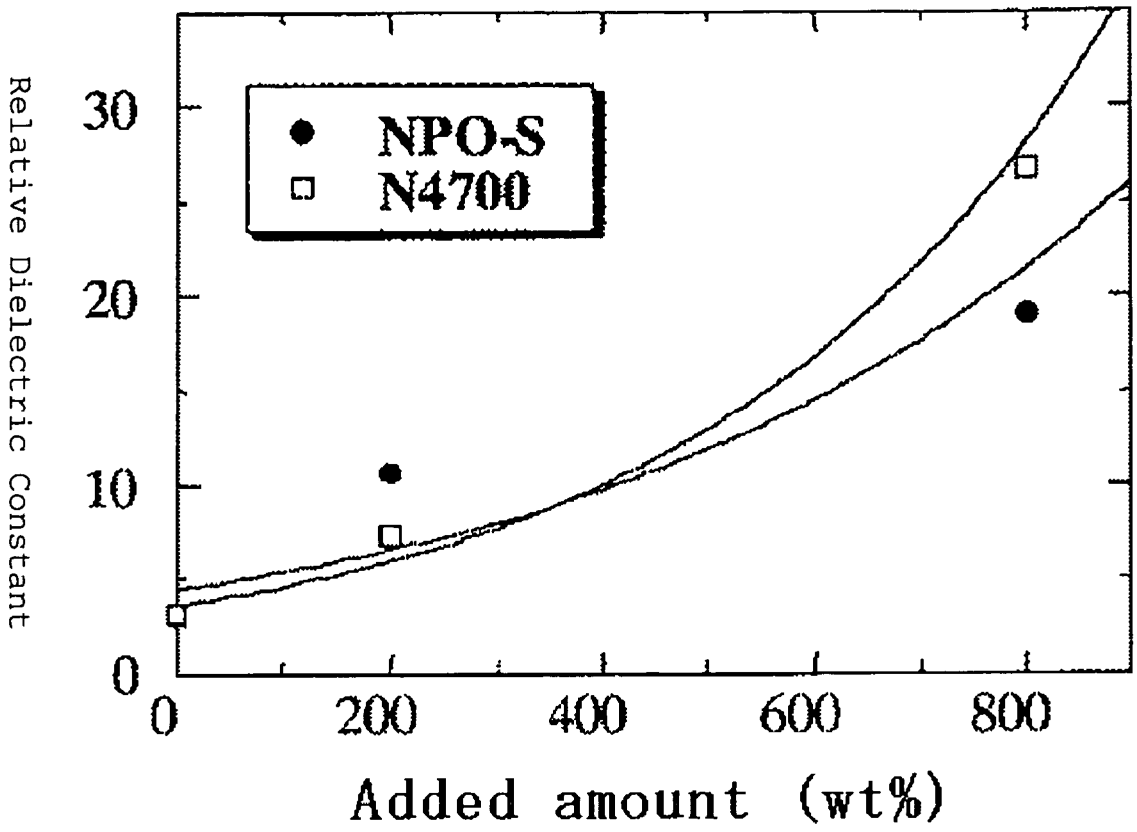
FIG. 1 shows a relation of the added quantity of a high dielectric filler to relative dielectric constant and dielectric loss tangent.

The present invention is hereinafter described.

Resin used for the present invention includes polyolefin resin such as polyethylene and polypropylene, polyester resin such as polyethylene terephthalate, polybutylene terephthalate, amorphous polyarylate and aromatic liquid-crystalline polyester, thermosetting resin such as phenol resin, epoxy resin, polyimide resin and cyanate resin, polycarbonate, polyamide, aromatic polysulfone, polyphenylene sulfide, polyether ketone, polyether sulfone, polyether imide, polyphenyl ether and a modified product thereof, and the like.

Among them, polyether imide resin, aromatic polysulfone and aromatic liquid-crystalline polyester are preferably used from the viewpoint of heat resistance or dielectric property, and aromatic liquid-crystalline polyester having a low moisture uptake is more preferably used.

Aromatic liquid-crystalline polyester is polyester, named thermotropic liquid-crystalline polymer, which forms an anisotropic melt at a temperature of 450° C. or less.

Aromatic liquid-crystalline polyester includes as follows:

(1) a polyester comprising a combination of a repeating unit derived from aromatic hydroxycarboxylic acid, aromatic dicarboxylic acid and aromatic diol, (2) a polyester comprising repeating unit derived from different aromatic hydroxycarboxylic acids, (3) a polyester comprising a combination of repeating unit derived from aromatic dicarboxylic acid and aromatic diol, (4) a polyester obtained by reacting polyester such as polyethylene terephthalate with aromatic hydroxycarboxylic acid, and the like.

In addition, instead of these aromatic hydroxycarboxylic acid, aromatic dicarboxylic acid and aromatic diol, an ester-forming derivative thereof may be employed.

An ester-forming derivative of carboxylic acid include derivatives which are highly reactive high reactivity acid chlorides, acid anhydrides and the like and capable of promoting a polyester producing reaction, derivatives which forms ester with alcohols and ethylene glycol and capable of producing polyester by transesterification.

Also, an example of ester-forming derivative of a phenolic hydroxyl group includes derivatives which form ester with carboxylic acids and produce polyester by transesterification.

Also, aromatic hydroxycarboxylic acid, aromatic dicarboxylic acid and aromatic diol may be substituted with a halogen atom such as a chlorine atom and a fluorine atom, an alkyl group such as a methyl group and an ethyl group, an aryl group such as a phenyl group, and the like to the extent that these substituents do not interfere with ester-formability.

A repeating unit of aromatic liquid-crystalline polyester includes the following, and is not limited thereto.

A repeating unit derived from aromatic hydroxycarboxylic acid:

($A_1$)

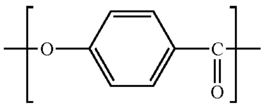

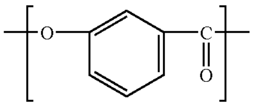

-continued (A₂)

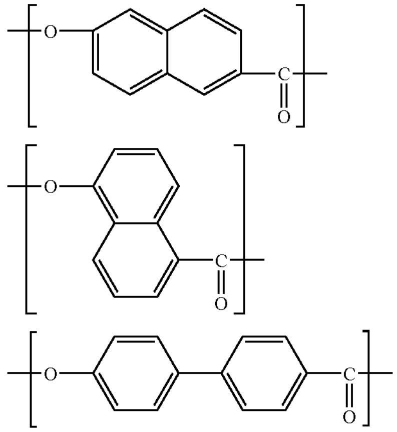

The above-mentioned repeating unit may be substituted with a halogen atom or an alkyl group.

A repeating unit derived from aromatic dicarboxylic acid:

($B_1$)

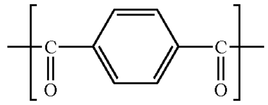

($B_2$)

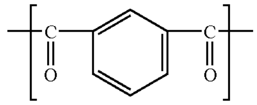

($B_3$)

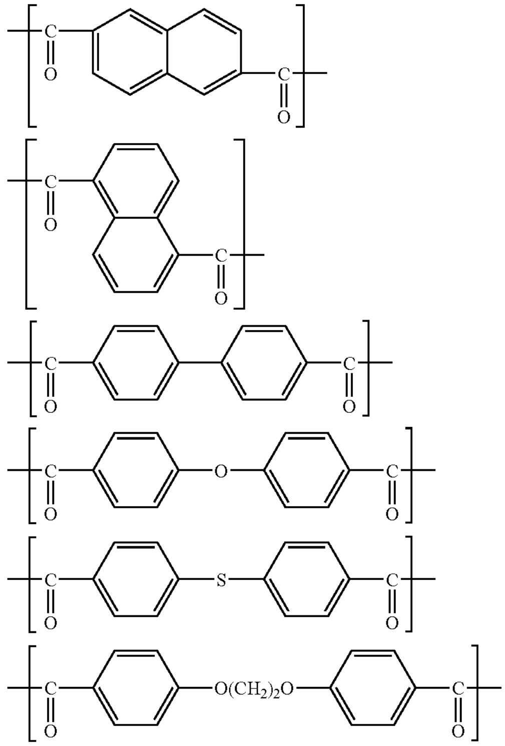

The above-mentioned repeating unit may be substituted with a halogen atom, an alkyl group or an aryl group.

A repeating unit derived from aromatic diol:

($C_1$)

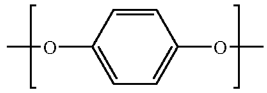

($C_2$)

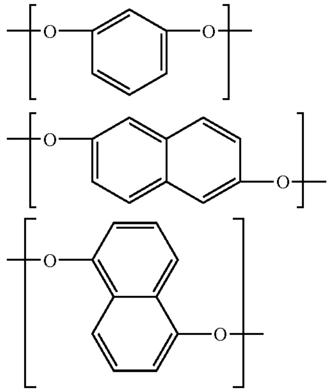

($C_3$)

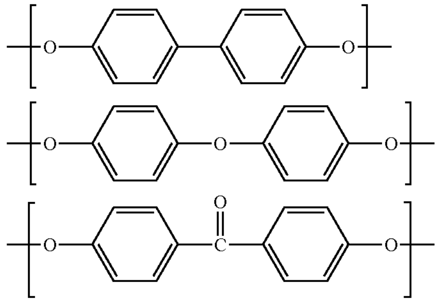

($C_4$)

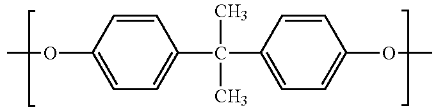

($C_5$)

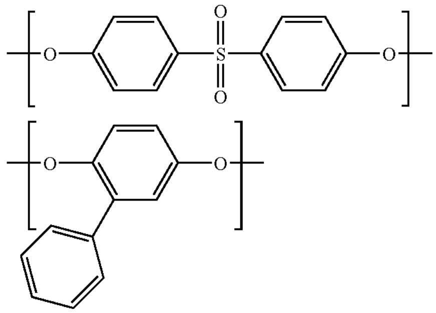

The above-mentioned repeating unit may be substituted with a halogen atom, an alkyl group or an aryl group.

The above-mentioned alkyl group is preferably an alkyl group with a carbon number of 1 to 10, and the above-mentioned aryl group is preferably an aryl group with a carbon number of 6 to 20.

Aromatic liquid-crystalline polyester preferably contains at least 30 mol % of a repeating unit represented in the above-mentioned formula ($A_1$) in view of the balance of heat resistance and mechanical physical properties.

A preferable combination of repeating units includes the following (a) to (f).

(a): a combination of ($A_1$), ($B_2$), and ($C_3$), a combination of ($A_2$), ($B_2$) and ($C_3$), a combination of ($A_1$), ($B_1$), ($B_2$) and ($C_3$), a combination of ($A_2$), ($B_1$), ($B_2$) and ($C_3$), or a combination of ($A_2$), ($B_3$), and ($C_3$)

(b): the combination in which ($C_3$) is partly or wholly replaced with ($C_1$) in each combination of above (a).

(c): the combination in which ($C_3$) is partly or wholly replaced with ($C_2$) in each combination of above (a).

(d): the combination in which ($C_3$) is partly or wholly replaced with ($C_4$) in each combination of above (a).

(e): the combination in which ($C_3$) is partly or wholly replaced with a mixture of ($C_4$) and ($C_5$) in each combination of above (a).

(f): the combination in which ($A_1$) is partly or wholly replaced with ($A_2$) in each combination of above (a).

From the viewpoint of heat resistance, aromatic liquid-crystalline polyester preferably comprises 30 to 80 mol % of a repeating unit derived from at least one compound selected from the group consisting of p-hydroxybenzoic acid and 2-hydroxy-6-naphthoic acid, 10 to 35 mol % of a repeating unit derived from at least one compound selected from the group consisting of hydroquinone and 4,4'-dihydroxybiphenyl, and 10 to 35 mol % of a repeating unit derived from at least one compound selected from the group consisting of terephthalic acid, isophthalic acid and 2,6-naphthalenediol.

From the viewpoint of low relative dielectric constant, more preferable aromatic liquid-crystalline polyester is an aromatic liquid-crystalline polyester comprising 30 to 80 mol % of a repeating unit derived from 2-hydroxy-6-naphthoic acid, 10 to 35 mol % of a repeating unit derived from 4,4'-dihydroxybiphenyl, and 10 to 35 mol % of a repeating unit derived from at least one compound selected from the group consisting of isophthalic acid and 2,6-naphthalenediol.

Also, the weight-average molecular weight of aromatic liquid-crystalline polyester is not particularly limited, however preferably 10000 to 100000.

A method of producing aromatic liquid-crystalline polyester used for the present invention is not particularly limited; for example, including a method such that at least one selected from the group consisting of aromatic hydroxycarboxylic acid and aromatic diol is acylated by an excessive quantity of fatty acid anhydride to obtain an acylated product, and then the obtained acylated product is melt-polymerized by transesterifying (polycondensing) with at least one selected from the group consisting of aromatic hydroxycarboxylic acid and aromatic dicarboxylic acid. Fatty acid ester obtained by previously acylating may be used as the acylated product.

In the acylating reaction, the added quantity of fatty acid anhydride is preferably 1.0 to 1.2-times equivalents of a phenolic hydroxyl group, more preferably 1.05 to 1.1-times equivalents weight. If added quantity is less than 1.0-time equivalent of fatty acid anhydride, the equilibrium of acylation shifts to the fatty acid anhydride, causing sublimation of the raw materials during transesterification (polycondensation) and clogging of the piping of such as reaction vessel, with the result that the reaction speed will decrease and sometimes the reaction will no longer advance, if an added quantity is more than 1.2-times equivalents coloring of obtained aromatic liquid-crystalline polyester may be more significant.

The acylating reaction is preferably performed at a temperature of about 130 to about 180° C. for about 5 minutes to about 10 hours, more preferably at a temperature of about 140 to about 160° C. for about 10 minutes to about 3 hours.

Fatty acid anhydride used for the acylating reaction is not particularly limited; for example, including acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride, and the like; a mixture of two kinds or more of these may be used. From the viewpoint of costs and handling, acetic anhydride, propionic anhydride, butyric anhydride and isobutyric anhydride are preferable, and butyric anhydride is more preferable.

In the transesterification, an acyl group of the acylated product is preferably 0.8 to 1.2-times equivalents of a carboxylic group.

The transesterification is preferably performed while heating at a rate of 0.1 to 50° C./minute at a temperature of about 130 to about 400° C., more preferably at a rate of 0.3 to 5° C./minute at a temperature of about 150 to about 350° C.

During transesterifying the acylated fatty acid ester with carboxylic acid, a by-produced fatty acid and unreacted fatty acid anhydride are preferably evaporated out of the system through vaporization and the like for the purpose of shifting the equilibrium.

The acylating reaction and the transesterification may be performed in the presence of a catalyst. The catalyst to be used include a conventional catalyst as a catalyst for polymerizing polyester; for example, including metallic salt catalysts such as magnesium acetate, tin acetate, tetrabutyl titanate, lead acetate, sodium acetate, potassium acetate and antimonous oxide, organic compound catalysts such as N,N-dimethylaminopyridine and N-methyl imidazole, and the like. The catalyst is usually charged at the moment of charging monomers and is not necessarily removed after the acylation, and then directly the transesterification can be performed in the case of not removing the catalyst.

The polycondensation by the transesterification is usually performed by melt-polymerization, which may be used together with solid-phase polymerization. With regard to the solid-phase polymerization, a polymer is extracted in the process of melt-polymerizing and thereafter pulverized into powder-like or flake-like, and then a solid-phase polymerization method is preferably performed; for example, the method include a method of heat-treating in the solid-phase state under an inert-gas such as nitrogen at a temperature of about 20 to about 350° C. for 1 to 30 hours. The solid-phase polymerization may be performed while stirring or in a state of standing without stirring. By providing equipment of a proper stirring mechanism, both of a melt-polymerization and a solid-phase polymerization is conducted in the same reaction vessel. After the solid-phase polymerization, the obtained liquid-crystalline polyester may be pelletized and molded by a conventional method.

The production of aromatic liquid-crystalline polyester can be performed by using a batch apparatus, a continuous apparatus and the like.

An aromatic polysulfone used for the present invention is a resin comprising at least one repeating unit selected from the group consisting or a repeating unit represented by formula (D1), a repeating unit of formula (D2) and a repeating unit of formula (D3) An aromatic polysulfone may be either random copolymer of alternative copolymer comprising a repeating unit represented by formula (D1), a repeating unit of formula (D2) and/or a repeating unit of formula (D3).

D1

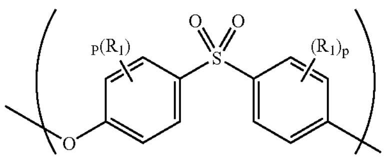

In D1, $R_1$ represents alkyl group having 1 to 6 carbon atoms, alkenyl group having 2 to 10 carbon atoms, phenyl group, or halogen atom, and p is an integer of from 0 to 4. $R_1$ on the same or different aromatic ring may be the same as or different from each other. Each p may be the same as or different from each other.

D2

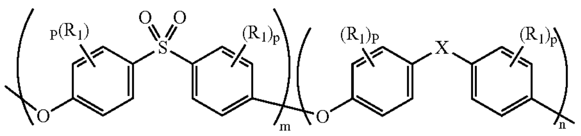

In D2, $R_1$ represents the same group as mentioned above, and p is an integer of from 0 to 4. m and n are an average number of the repeating number of each unit in polymer, and are positive number of from 0.1 to 100. $R_1$ on the same or different aromatic ring may be the same as or different from each other. Each p may be the same as or different from each other. X represents alkylene group having 1 to 20 carbon atoms, carbonyl group, divalent sulfur and divalent oxygen.

D3

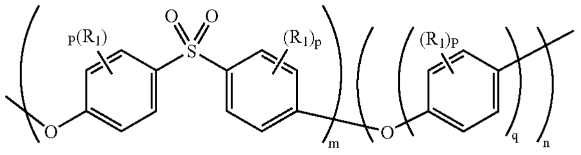

In D3, $R_1$ represents the same group as mentioned above, and p is an integer of from 0 to 4. q is an integer of from 1 to 5. m and n are an average number of the repeating number of each unit in polymer, and positive number of from 0.1 to 100. $R_1$ on the same or different aromatic ring may be the same as or different from each other. Each p may be different from each other. X represents alkylene group having 1 to 20 carbon atoms, carbonyl group, divalent sulfur and divalent oxygen.

An alkyl group having 1 to 6 carbon atoms includes methyl, ethyl, tert-butyl and cyclohexyl group. An alkenyl group having 2 to 10 carbon atoms includes ethynyl and iso-propenyl group. Halogen atom includes fluorine, chlorine, bromine and iodine. An alkylene group having 1 to 20 carbon atoms includes a saturated aliphatic alkylene group such as isopropylidene group, ethylidene group and methylene group, an unsaturated aliphatic alkylene group such as ethynylene group, and aromatic alkylene group such as xylylene and phenyl methylene group.

If an aromatic polysulfone used for the present invention comprises a repeating unit represented by D2 or D3, m/(m+n) is preferably not less than 0.8. q in D3 is preferably 1 or 2, and more preferably 2.

In the present invention, a preferable aromatic polysulfone is an aromatic polysulfone comprising a repeating unit represented by D1 or a repeating unit represented by D2, and a more preferable polysulfone is an aromatic polysulfone comprising a repeating unit represented by D1. Among these, an aromatic polysulfone comprising a repeating unit wherein all qs are 0, such as a repeating unit represented by below formula, is preferable. And an aromatic polysulfone comprising not less than 80 mol % of a repeating unit represented by below formula in a polymer chain is more preferable.

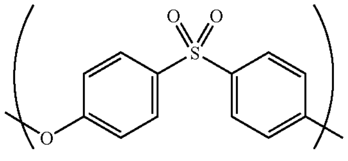

A reduced viscosity of an aromatic polysulfone used for the present invention is usually from 0.5 to 1 dl/g, preferably from 0.60 to 0.90 dl/g, and more preferably from 0.70 to 0.90 dl/g. When a reduced viscosity of an aromatic polysulfone is less than 0.5 dl/g, a composition of an aromatic polysulfone suitable for casting method may not be obtained. When a reduced viscosity of an aromatic polysulfone is more than 1 dl/g, it maybe difficult to prepare a homogeneous solution, and to filter or defoam a solution, resulting in deteriorating an appearance of an obtained film.

A reduced viscosity of the present invention is measured by the method wherein 1 g of an aromatic polysulfone is dissolved in 100 $cm^3$ of N,N-dimethylformamide, and then a reduced viscosity of the solution is measured by using Ostwald's viscometer at 25° C.

An aromatic polysulfone used for the present invention is produced by the conventional method, or is commercially available one. A commercially available aromatic polysulfone includes a trade name Sumikaexcel PES of Sumitomo Chemical Company which comprises D1, and a trade name UDELP-1700 of AMOCO Corporation which comprises D1 and D2. The terminal structure of an aromatic polysulfone is not restricted since it is varied with the method of producing, and includes Cl, OH, OR (R; alkyl group).

A polyether imide used for the present invention is a resin comprising a repeating unit represented by E1.

E1

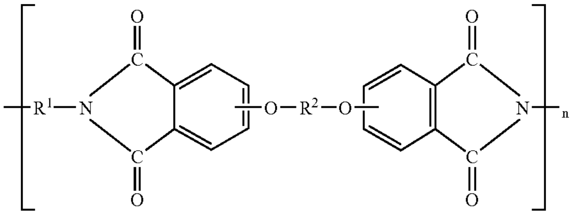

In E1, $R^1$ and $R^2$ are any one of organic group selected from the below group.

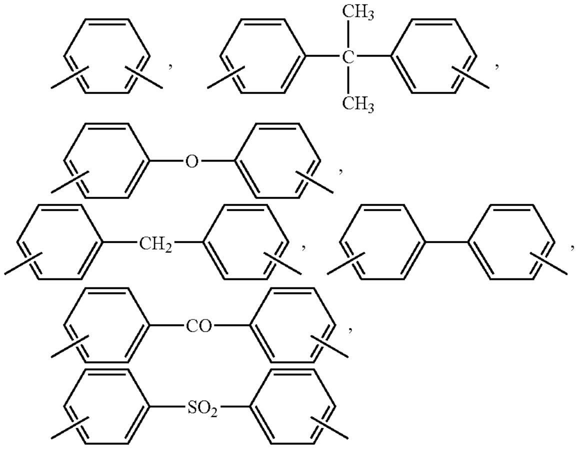

Among these, a preferable polyether imide is a polyether imide represented by E2.

The high dielectric filler include, for example $Al_2O_3$, BN, BaO, BeO, $Bi_2O_3$, CaO, $Cr_2O$, $Fe_2O_3$, $La_2O_3$, $Na_2O$, $Nd_2O_3$, SiC, $Si_2N_4$, $SiO_2$, SrO, $TiO_2$, $Y_2O_3$, $ZrO_2$, and the like; usually a combination of two or more of these is used.

The high dielectric filler is preferably a high dielectric filler which is a combination of at least two selected from BaO, $Bi_2O_3$, $La_2O_3$, $Nd_2O_3$ and $TiO_2$, more preferably a combination of $TiO_2$ and at least one selected from BaO, $Bi_2O_3$, $La_2O_3$, $Nd_2O_3$ and $TiO_2$, the ratio of $TiO_2$ to the total amount of all high dielectric filler being 10 to 50 weight %.

The particle diameter of the high dielectric filler is preferably 10 μm or less from the viewpoint of the dispersibility into resin, more preferably 2 μm or less.

The content of the high dielectric filler is preferably 50 to 1200 parts by weight to 100 parts by weight of resin, more preferably 200 to 900 parts by weight.

If content is less than 50 parts by weight, a dielectric constant of a film obtained from a resin composition may not sufficiently be increased, while a content is more than 1200 parts by weight, the effect of resin as a binder for fillers may be reduced to render an obtained film fragile.

E2

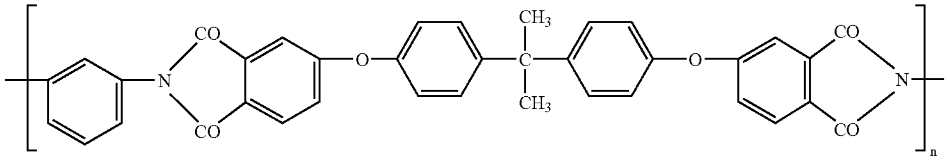

A polyether imide used for the present invention is produced by the conventional method, or commercailly available one. A commercially available polyether imide includes a trade name Ultem of General Electric Company which comprises E2.

A high dielectric filler used for the present invention has a relative dielectric constant satisfying the following formulae (1) and (2).

$$[(\epsilon_T-\epsilon_{25})/\epsilon_{25}]_{MAX} \leqq 0.03 \quad (1)$$

$$40 \leqq \epsilon_{25} \leqq 1000 \quad (2)$$

Here, $\epsilon_T$ denotes a relative dielectric constant of a high dielectric filler at a temperature T, which is from −20 to 80° C.

$\epsilon_{25}$ denotes a relative dielectric constant of a high dielectric filler at a temperature of 25° C.

$[(\epsilon_T-\epsilon_{25})/\epsilon_{25}]_{MAX}$ denotes a maximum value of an absolute value of a relative dielectric constant variation $(\epsilon_{T-}\epsilon_{25})/\epsilon_{25}$. $[(\epsilon_T-\epsilon_{25})/\epsilon_{25}]_{MAX}$ is the maximum value obtained by calculating $(\epsilon_T-\epsilon_{25})/\epsilon_{25}$ for T between −20 to 80° C. $\epsilon_T$ and $\epsilon_{25}$ are obtained by the known method of measuring dielectric constant.

A high dielectric filler preferably has a relative dielectric constant satisfying the following formulae (3) and (4).

$$[(\epsilon_T-\epsilon_{25})/\epsilon_{25}]_{MAX} \leqq 0.01 \quad (3)$$

$$80 \leqq \epsilon_{25} \leqq 300 \quad (4)$$

Here, $\epsilon_T$, $\epsilon_{25}$ and $[(\epsilon_T-\epsilon_{25})/\epsilon_{25}]_{MAX}$ signify the same as the above.

A high dielectric resin composition of the present invention may further contain a solvent.

A method of adding a solvent includes a method of previously mixing a high dielectric filler and resin, and thereafter adding a solvent thereto; a method of previously dissolving resin in a solvent to obtain a resin solution, filtering the solution by a filter and the like as required to remove minute foreign matters contained in the solution, and thereafter adding a high dielectric filler thereto; and the like.

The addition of a solvent may provide a high concentration of a high dielectric filler to be contained in resin.

The solvent is properly selected in accordance with resin to be used and a kind thereof is not particularly limited if it can dissolve resin.

In the case of using aromatic liquid-crystalline polyester as resin, from the viewpoint where a solvent to be used easily dissolves aromatic liquid-crystalline polyester at room temperature or in the heating state, a preferable solvent is a mixture containing 30 weight % or more of a halogen-substituted phenolic compound component represented by the following general formula (5) with respect to the amount of the mixture, more preferably containing 60 weight % or more of the phenolic compound component, and further more preferably using substantially 100 weight % of the phenolic compound as the solvent.

(5)

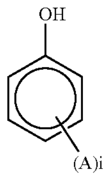

In the formula, A denotes a halogen atom or a trihalogenated methyl group and i denotes an integer of 1 to 5. In the case where i is 2 or more, a plurality of A may be the same or different, preferably the same.

A halogen atom includes a fluorine atom, a chlorine atom, a bromine atom and an iodine atom, preferably a fluorine atom and a chlorine atom, and particularly preferably a chlorine atom.

An example of the general formula (5) in which a halogen atom is a fluorine atom includes pentafluorophenol, tetrafluorophenol and the like.

An example of the general formula (5) in which a halogen atom is a chlorine atom includes o-chlorophenol and p-chlorophenol, preferably p-chlorophenol from the viewpoint of solubility.

A halogen of the trihalogenated methyl group include a fluorine atom, a chlorine atom, a bromine atom and an iodine atom.

An example of the general formula (5) in which a halogen of the trihalogenated methyl group is a fluorine atom includes 3,5-bistrifluoromethyl phenol.

The solvent to be used is preferably a solvent containing 30 weight % or more of a chlorine-substituted phenolic compound such as o-chlorophenol and p-chlorophenol from the viewpoint of costs and availability, more preferably a solvent containing 30 weight % or more of p-chlorophenol from the viewpoint of solubility.

Other components except a halogen-substituted phenolic compound may be contained in the solvent to the extent that aromatic liquid-crystalline polyester is not deposited in the conserving of the solution or the after-mentioned casting.

Other components optionally contained are not particularly limited; for example, including a compound having chlorine such as chloroform, methylene chloride and tetrachloroethane, and the like.

In a high dielectric resin composition of the present invention, the ratio of aromatic liquid-crystalline polyester to a solvent containing 30 weight % or more of a halogen-substituted phenolic compound (5) is preferably 0.5 to 100 parts by weight with respect to 100 parts by weight of the solvent, from the viewpoint of workability and economy, more preferably 1 to 50 parts by weight, and further more preferably 3 to 10 parts by weight.

If content is less than 0.5 part by weight, production efficiency may be deteriorated, while a content is more than 100 parts by weight, the solubility may be decreased.

In the case of using an aromatic polysulfone or aromatic polyether imide as resin, a solvent includes amides such as N-methyl-2-pyrrolidone, N,N-dimethylformamide, N,N-dimethylacetamide, sulfoxides such as diemthyl sulfoxide, phenols such as cresol, halogenated alkyl such as methylene chloride, and esters such as γ-butyrolactone. These solvents used alone or a mixture thereof. Among them, a solvent having low boiling point such as N,N-dimethylformamide and methylene chloride are preferable, and methylene chloride is more preferable. Methylene chloride may be used in the form of a mixture containing 80 weight % or more in the mixture, more preferably using substantially 100 weight % of methylene chloride as a solvent. To the solvent, alcohols such as methanol or ethanol may be added in the range of from 1 to 10 weight % in order to prevent precipitation of a resin during storage.

The following may be added to a high dielectric resin composition of the present invention within a range of no deterioration in the object thereof: one, or two or more of inorganic fillers such as silica, aluminum hydroxide and calcium carbonate, organic fillers such as cured epoxy resin, cross-linked benzoguanamine resin and cross-linked acrylic polymer, and various additives such as a silane coupling agent, an antioxidant and an ultraviolet absorbing agent.

A dielectric resin film can be produced from a high dielectric resin composition of the present invention by a conventional method such as T-die film formation method, tubular-process film formation method and like, In the case where a high dielectric resin composition contains a solvent, the removal of the solvent therefrom allows a high dielectric resin film to be obtained.

A method of manufacturing a high dielectric resin film includes a method of casting a high dielectric resin composition containing a solvent on a uniform base substance having a flat surface made of metal, glass and the like, and there after removing the solvent.

A method of removing a solvent is not particularly limited and preferably performed by vaporizing the solvent. A method of vaporizing a solvent involves a method such as heating, decompressing and ventilating. An obtained high dielectric resin film may be further heat-treated.

A high dielectric resin film obtained from a high dielectric resin composition of the present invention is appropriately usable for uses of a film condenser or a condenser built in a base material (embedded base material) as dielectric layer, and an antenna module, wireless LAN module, and ETC module, utilizing the properties of high dielectric constant and small dielectric loss tangent.

EXAMPLES

The present invention is hereinafter described by using examples, and it is apparent that the present invention is not limited thereto.

Example 1

141 g (1.02 moles) of para-hydroxybenzoic acid, 63.3 g (0.34 moles) of 4,4'-dihydroxybiphenyl, 56.5 g (0.34 moles) of isophthalic acid, and 191 g (1.87 moles) of acetic anhydride were charged into a reaction vessel provided with a stirrer, a torquemeter, a nitrogen gas introduction pipe, a thermometer, and are flux condenser. After being sufficiently replaced with nitrogen gas in the reaction vessel, the inside thereof was heated to 150° C. in 15 minutes under nitrogen gas airflow to be maintained at the temperature and refluxed for 3 hours.

Then, the inside thereof was heated to a temperature of 320° C. over 170 minutes while evaporating out distillating by-produced acetic acid and unreacted acetic anhydride so as to be regarded as the completion of the reaction at the point of time when the rise of torque was observed, and the contents were taken out. The obtained solid mass was cooled to room temperature and ground by a rough grinder to be thereafter maintained at a temperature of 250° C. for 3 hours under nitrogen gas atmosphere, and the solid-phase polymerization was progressed.

0.4 g of the obtained aromatic liquid-crystalline polyester powder was compression-molded under a load of 100 kg at a temperature of 250° C. for 10 minutes by using the Flow Tester CFT-500 manufactured by SHIMADZU CORPORATION to obtain a disc-plate test piece having a thickness of 3 mm. With regard to this test piece, the coefficient of water absorption at 85° C./85% RH·168 hours was measured by an ADVANTEC AGX type thermo-hygrostat manufactured by TOYO ENGINEERING WORKS, LTD., whereby it was confirmed that the coefficient of water absorption was 0.1% or less. Inaddition, themeltingpoint (the temperature of liquid crystallization) of the aromatic liquid-crystalline polyester powder was measured by using the DSC-50 manufactured by SHIMADZU CORPORATION to be approximately 320° C.

0.5 g of the aromatic liquid-crystalline polyester powder obtained by the above-mentioned process was added to 9.5 g of p-chlorophenol, and 4.0 g of NPO-S manufactured by FUJI TITANIUM INDUSTRY CO., LTD. was further added as a high dielectric filler thereto.

When the temperature T of the NPO-S was in a range of −20° C. ≦T≦80° C., the maximum value of $[(\in_T-\in_{25})/\in_{25}]$ was 0.01 or less and the relative dielectric constant $\in_{25}$ at a temperature of 25° C. was 100. With regard to the measurement of the relative dielectric constant of the high dielectric filler, the high dielectric filler was first burned under the condition of high temperature and the relative dielectric constant thereof was measured by an impedance analyzer manufactured by HP. A solution comprising aromatic liquid-crystalline polyester, high dielectric filler and p-chlorophenol was heated to 120° C. so as to be completely dissolved, whereby obtaining a transparent solution. This solution was cast on a glass base substance to vaporize the solvent by a hot plate at a preset temperature of 100° C. for 1 hour and be thereafter heat-treated by a hot-air dryer at a preset temperature of 250° C. for 1 hour, whereby obtaining a high dielectric resin film.

The relative dielectric constant and the dielectric loss tangent of the obtained high dielectric resin film were measured by an impedance analyzer manufactured by HP to be 19.0 and 0.002 respectively (frequency: 1 GHz). Further, FIG. 1 shows a relation of the added amount of the high dielectric filler NPO-S to relative dielectric constant and dielectric loss tangent (frequency: 1 GHz).

Example 2

128 g (0.68 moles) of 2-hydroxy-6-naphthoic acid, 63.3 g (0.34 moles) of 4,4'-dihydroxybiphenyl, 56.5 g (0.34 moles) of isophthalic acid, and 152.7 g (1.50 moles) of acetic anhydride were charged into a reaction vessel provided with a stirrer, a torquemeter, a nitrogen gas introduction pipe, a thermometer, and a reflux condenser. After being sufficiently replaced with nitrogen gas in the reaction vessel, the inside thereof was heated to 150° C. in 15 minutes under nitrogen gas airflow to be maintained at the temperature and refluxed for 3 hours.

Then, the inside thereof was heated to a temperature of 320° C. over 170 minutes while evaporating out distillating by-produced acetic acid and unreacted acetic anhydride. The completion of the reaction was regarded at the point of time when the rise of torque was observed, and the contents were taken out. The obtained solid mass was cooled to room temperature and ground by a rough grinder to be thereafter maintained at a temperature of 250° C. for 3 hours under nitrogen gas atmosphere, and the solid-phase polymerization was progressed to obtain aromatic liquid-crystalline polyester powder. The obtained aromatic liquid-crystalline polyester powder showed a schlieren pattern which specific for a compound having liquid-crystallinity in liquid-crystalline phase by observing with polarization microscope at 350° C.

0.4 g of the obtained aromatic liquid-crystalline polyester powder was compression-molded under a load of 100 kg at a temperature of 250° C. for 10 minutes by using the Flow Tester CFT-500 manufactured by SHIMADZU CORPORATION to obtain a disc-plate test piece having a thickness of 3 mm. With regard to this test piece, the coefficient of water absorption at 85° C./85% RH·168 hours was measured by an ADVANTEC AGX type thermo-hygrostat manufactured by TOYO ENGINEERING WORKS, LTD., whereby it was confirmed that the coefficient of water absorption was 0.1% or less. The dielectric loss tangent of the test piece was measured by an impedance analyzer manufactured by HP to be 0.001 (frequency: 1 GHz).

0.5 g of the aromatic liquid-crystalline polyester powder obtained by the above-mentioned process was added to 9.5 g of p-chlorophenol, and 2.0 g of NPO-S manufactured by FUJI TITANIUM INDUSTRY CO., LTD. was further added as a high dielectric filler thereto.

A solution comprising aromatic liquid-crystalline polyester, high dielectric filler and p-chlorophenol was heated to 120° C. so as to be completely dissolved, whereby obtaining a transparent solution. This solution was cast on a glass base substance to vaporize the solvent by a hot plate at a preset temperature of 100° C. for 1 hour and be thereafter heat-treated by a hot-air dryer at a preset temperature of 250° C. for 1 hour, whereby obtaining a high dielectric resin film.

The relative dielectric constant and the dielectric loss tangent of the obtained high dielectric resin film were measured by an impedance analyzer manufactured by HP to be 14.0 and 0.002 respectively (frequency: 1 GHz).

Example 3

A high dielectric resin film was obtained in the same manner as in Example 2 except that HF-120 manufacture by Kyoritsu Material was used as a high dielectric filler. When the temperature T of the NF-120 was in a range of −20° C.≦T≦80° C., the maximum value of $[(\in_T-\in_{25})/\in_{25}]$ was 0.01 or less and the relative dielectric constant $\in_{25}$ at a temperature of 25° C. was 120.

The relative dielectric constant and the dielectric loss tangent of the obtained high dielectric resin film were measured by an impedance analyzer manufactured by HP to be 17.0 and 0.002 respectively (frequency: 1 GHz).

Example 4

1.6 g of polyether sulfone PES powder (manufactured by Sumitomo Chemical Company, a reduced viscosity: 0.76 dl/g) as an aromatic polyether sulfone was added to 8.0 g of methylene chloride and 0.4 g of methanol, and further added 6.7 g of HF-120 manufacture by Kyoritsu Material as high dielectric filler thereto. A solution comprising the aromatic polyether sulfone, the high dielectric filler, methylene chloride and methanol was mixed at room temperature to be completely dissolved. This solution was cast on a glass base substance to vaporize the solvent by a hot plate at a preset temperature of 100° C. for 1 hour and be thereafter heat-treated by a hot-air dryer at a preset temperature of 250° C. for 1 hour, whereby obtaining a high dielectric resin film.

The relative dielectric constant and the dielectric loss tangent of the obtained high dielectric resin film were measured by an impedance analyzer manufactured by HP to be 17.3 and 0.004 respectively (frequency: 1 GHz).

Example 5

1.6 g of an aromatic polyether imide (manufactured by General Electric Company, trade name; E3010) as an aromatic polyether imide was added to 8.0 g of methylene chloride, and further added 7.4 g of HF-120 manufacture by Kyoritsu Material as high dielectric filler thereto. A solution comprising the aromatic polyether imide, the high dielectric filler and methylene chloride was mixed at room temperature to be completely dissolved. This solution was cast on a glass base substance to vaporize the solvent by a hot plate at a preset temperature of 100° C. for 1 hour and be thereafter heat-treated by a hot-air dryer at a preset temperature of 250° C. for 1 hour, whereby obtaining a high dielectric resin film.

The relative dielectric constant and the dielectric loss tangent of the obtained high dielectric resin film were measured by an impedance analyzer manufactured by HP to be 16.1 and 0.017 respectively (frequency: 1 GHz).

Comparative Example 1

A high dielectric resin film was obtained in the same manner as in Example 1 except for replacing a high dielectric filler with N4700manufactured by FUJI TITANIUM INDUSTRY CO., LTD. Here, when the temperature T of the N4700 was in a range of −20° C.≦T≦80° C., the maximum value of $[(\in_{T-\in 25})/\in_{25}]$ was 0.26 and the relative dielectric constant $\in_{25}$ at a temperature of 25° C. was 550.

The relative dielectric constant and the dielectric loss tangent of the obtained high dielectric resin film were measured by an impedance analyzer manufactured by HP to be 26.8 and 0.013 respectively (frequency: 1 GHz).

Comparative Example 2

A high dielectric resin film was obtained in the same manner as in Example 1 except for replacing a high dielectric filler with BT-335 manufactured by FUJI TITANIUM INDUSTRY CO., LTD. Here, when the temperature T of the BT-335 was in a range of −20° C.≦T≦80° C., the maximum value of $[(\in_T-\in_{25})/\in_{25}]$ was 0.027 and the relative dielectric constant $\in_{25}$ at a temperature of 25° C. was 1600.

The relative dielectric constant and the dielectric loss tangent of the obtained high dielectric resin film were measured by an impedance analyzer manufactured by HP to be 33.0 and 0.024 respectively (frequency: 1 GHz).

The present invention can provide a resin composition which is capable of manufacturing a high dielectric resin film having high dielectric constant and small dielectric loss tangent.

What is claimed is:

1. A high dielectric resin composition comprising:

a high dielectric filler; and resin;

wherein a relative dielectric constant of the high dielectric filler satisfies the following formulae (1) and (2), $$[(\in_T-\in_{25})/\in_{25}]_{MAX}\leqq 0.03 \quad (1)$$

$$40\leqq\in_{25}\leqq 1000 \quad (2)$$

wherein, $\in_T$ represents the relative dielectric constant of the high dielectric filler at a temperature T, the temperature T is from to −20 to 80° C., $\in_{25}$ represents the relative dielectric constant of the high dielectric filler at a temperature of 25° C., and $[(\in_T-\in_{25})/\in_{25}]_{MAX}$ denotes a maximum value of an absolute value of a relative dielectric constant variation $(\in_T-\in_{25}.)$, and wherein the high dielectric filler is at least two selected from the group consisting of BaO, $Bi_2O_3$, $La_2O_3$, Nd $_2O_3$ and $TiO_2$.

2. The composition according to claim 1, wherein the composition further comprises a solvent.

3. The composition according to any one of claims 1 or 2, wherein the resin is aromatic liquid-crystalline polyester.

4. The composition according to claim 3, wherein the aromatic liquid-crystalline polyester comprises 30 to 80 mol % of a repeating unit derived from at least one compound selected from the group consisting of p-hydroxybenzoic acid and 2-hydroxy-6-naphthoic acid, 10 to 35 mol % of a repeating unit derived from at least one compound selected from the group consisting of hydroquinone and 4,4'-dihydroxybiphenyl, and 10 to 35 mol % of a repeating unit derived from at least one compound selected from the group consisting of terephthalic acid, isophthalic acid and 2,6-naphthalenediol.

5. The composition according to claim 2, wherein the solvent contains a halogen-substituted phenolic compound.

6. The composition according to claim 5, wherein a content of the halogen-substituted phenolic compound is 30 weight % or more of the solvent.

7. The composition according to claim 1, wherein the resin is aromatic polysulfone.

8. The composition according to claim 1, wherein the resin is aromatic polyether sulfone.

9. The composition according to claim 2, wherein the resin is aromatic polysulfone.

10. The composition according to claim 2, wherein the resin is aromatic polyether sulfone.

11. The composition according to any one of claims 9 or 10, wherein the solvent contains methylene chloride.

12. The composition according to claim 11, wherein the amount of methylene chloride is not less than 80 weight % of the solvent.

13. The composition according to claim 1, wherein the high dielectric filler is $TiO_2$ and at least one selected from the group consisting of BaO, $Bi_2O_3$, $La_2O_3$ and $Nd_2O_3$.

14. A high dielectric resin film comprising a high dielectric filler; and resin;

wherein a relative dielectric constant of the high dielectric filler satisfies the following formulae (1) and (2), $$[(\in_T-\in_{25})/\in_{25}]_{MAX}\leqq 0.03 \quad (1)$$

$$40\leqq\in_{25}\leqq 1000 \quad (2)$$

wherein, $\in_T$ represents the relative dielectric constant of the high dielectric filler at a temperature T, the temperature T is from to −20 to 80° C., $\in_{25}$ represents the relative dielectric constant of the high dielectric filler at a temperature of 25° C., and $[(\in_T-\in_{25})/\in_{25}]_{MAX}$ denotes a maximum value of an absolute value of a relative dielectric constant variation $(\in_T-\in_{25}.)$, and wherein the high dielectric filler is at least two selected from the group consisting of BaO, $Bi_2O_3$, $La_2O_3$,$Nd_2O_3$ and $TiO_2$.

15. A high dielectric resin film obtained by casting a composition according to claim 2 on a base substance and removing a solvent.

16. A method of producing a high dielectric resin film comprising casting the composition according to claim 2 on a base substance, and removing a solvent.

17. A condenser comprising the high dielectric resin film according to claim 14 as a dielectric layer.

* * * * *